US005252171A

United States Patent [19]

Anderson et al.

[11] Patent Number: 5,252,171

[45] Date of Patent: Oct. 12, 1993

[54] HEAT SEALING APPARATUS

[75] Inventors: Ronald C. Anderson, Connellsville; David A. Myers, Mount Pleasant, both of Pa.

[73] Assignee: Stahls', Inc., St. Clair Shores, Mich.

[21] Appl. No.: 816,881

[22] Filed: Dec. 30, 1991

Related U.S. Application Data

[63] Continuation-in-part of Ser. No. 499,485, Jun. 18, 1990, abandoned.

[51] Int. Cl.[5] .......... B30B 5/02; B32B 3/00

[52] U.S. Cl. .......... 156/358; 156/359; 156/583.1; 100/50; 38/16

[58] Field of Search .......... 156/358, 359, 583.4, 156/580, 581, 583.1, 583.2; 100/50, 93 P, 51, 52; 38/16

[56] References Cited

U.S. PATENT DOCUMENTS

| | | | |
|---|---|---|---|
| 2,644,151 | 6/1953 | Krueger | 156/583.9 |
| 3,035,510 | 9/1959 | Carpenter et al. | 156/583.7 |
| 3,450,351 | 6/1969 | Peterson . | |
| 3,923,590 | 12/1975 | Humphries | 100/93 P |
| 3,979,248 | 9/1976 | Kussmaul | 156/359 |
| 3,982,054 | 7/1974 | Blazer et al. . | |
| 4,035,456 | 10/1977 | Carnegie, Jr. | 156/583.2 |
| 4,190,485 | 2/1980 | Takeda et al. | 156/583.9 |
| 4,243,470 | 1/1981 | Higashiguchi | 156/583.9 |
| 4,379,018 | 4/1983 | Griesdorn | 156/359 |
| 4,386,993 | 6/1983 | Matsuo | 156/358 |
| 4,469,545 | 9/1984 | Löw | 156/359 |
| 4,713,047 | 12/1987 | Klinkel | 156/358 |

FOREIGN PATENT DOCUMENTS 2170443 8/1986 United Kingdom .

*Primary Examiner*—Robert A. Dawson
*Assistant Examiner*—David Reifsnyder
*Attorney, Agent, or Firm*—Brooks & Kushman

[57] ABSTRACT

An improved apparatus (10) for thermally bonding indicia to fabric disclosed comprises relatively movable upper and lower platens (12,14) with a heat source in one of the platens for heating it. A lift lever (18) with an over-center locking assembly (20) is operated to urge the platens (12,14) together and a pressure adjustment assembly (40) is adjustable for varying the pressure therebetween. A pressure sensor (54) senses pressure between the platens (12,14) during closure. A temperature sensor (69) responds to the temperature of the heated platen (12) for controlling heat source (16) to regulate the platen (12) temperature. An optical switch (70) is responsive to platen (12,14) closure for initiating a timing sequence. A programmable controller (48) is programmable to monitor sets of temperature, pressure and platen closure combinations and a visual display (46) displays instructions and the time, temperature and pressure readings necessary for operating the apparatus (10) in the language of choice.

25 Claims, 7 Drawing Sheets

HEAT SEALING APPARATUS

CROSS-REFERENCE TO RELATED APPLICATION

This application is a continuation in-part of application Ser. No. 499,485, now abandoned filed Jun. 18, 1990 and entitled "Heat Sealing Apparatus."

TECHNICAL FIELD

This invention relates to apparatus for thermally bonding indicia to fabric and more particularly to a heat sealing machine of a type used for applying letters and logos to garments.

BACKGROUND ART

Conventional heat sealing machines are of two general types. The two types include a clam shell type and a swing away type. Both machines include upper and lower platens which are movable relative to one another and thereby registerable in a closed position. A heat source is included in one of the platens. Thermally bonding indicia such as letters, numbers and identifying logos are applied to a fabric such as a T-shirt, sweatshirt or other garment by placing the indicia on the fabric between the platens, applying pressure to force the platens toward one another and at the same time applying heat sufficient to cause the thermally bonding indicia to stick to the fabric. After an appropriate time interval, the platens are separated and the fabric with indicia attached is removed.

These two types of machines can further be categorized as manual, semi-automatic and automatic machines. All machines require an operator. The manual machines require the operator to control the pressure between the platens, the temperature and the time during which the pressure and temperature is applied to the indicia and fabric. Semi-automatic machines require the platens to be registered manually but release the platens automatically after the timing cycle. Automatic machines require compressed air or a motor to supply the force required to move the platens into a registration position and apply pressure and subsequently separate the platens after the timing cycle. Pressure between the platens during registration in these machines is a function of the force of the operator or other mechanical means used to accomplish registration. No manually operated or semi-automatic machines are known which include a means to control or regulate the pressure between the platens. This inability to control the pressure between the platens doesn't allow the operator to know that the pressure being applied is correct and results in inconsistent duplication when each of the same sets of letters and fabrics must be set up for bonding for each application. When incorrect pressure is applied, as often it is, a less than optimal bond between the indicia and fabric results.

The time during which the platens are registered is equally important as is the pressure applied and also the heat to insure a good bond of the letters to the garment. On both the manual and semi-automatic machine, the timing cycle is initiated by the operator and most often the timer is a clock or wristwatch although other types of timers have been employed. The inconsistency of having a human operator initiate the timing cycle gives rise to having different periods of application of pressure between the platens to similar letters and fabrics which leads to poor bonding.

Furthermore, no manually operated or semi-automatic machines are known which simultaneously control pressure, time and temperature. All of these variables are dependent upon one another yet no heat sealing machines simultaneously control these variables to provide an efficient application operation.

DISCLOSURE OF THE INVENTION

An object of the present invention is to provide an improved apparatus for thermally bonding indicia to fabric which is controllable with respect to pressure, time and temperature to insure consistent and reproducible bonding of indicia such as letters and logos to fabric such as wearing apparel, banners, etc. The improved apparatus is simple in construction and simple to use.

In carrying out the above object and other objects of the present invention, the improved apparatus has relatively movable upper and lower platens with a heat source in one of the platens for heating it and a mechanism for urging the platens together and for varying the pressure between the platens during closure. The improved apparatus is programmable with respect to duration of platen closure and temperature of the heated platen. The apparatus includes a pressure sensor for measuring the pressure between the platens during closure. A visual display is provided to indicate the pressure reading, temperature and duration of platen closure. The visual display is capable of displaying any commands or readings in any of several languages.

A programmable controller, operable to control the time, and temperature, includes a memory so that a plurality of sets of temperature, pressure, and platen closure periods can be stored in order to make the operation of the apparatus very easy when duplication of application of similar indicia to similar fabric is required.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
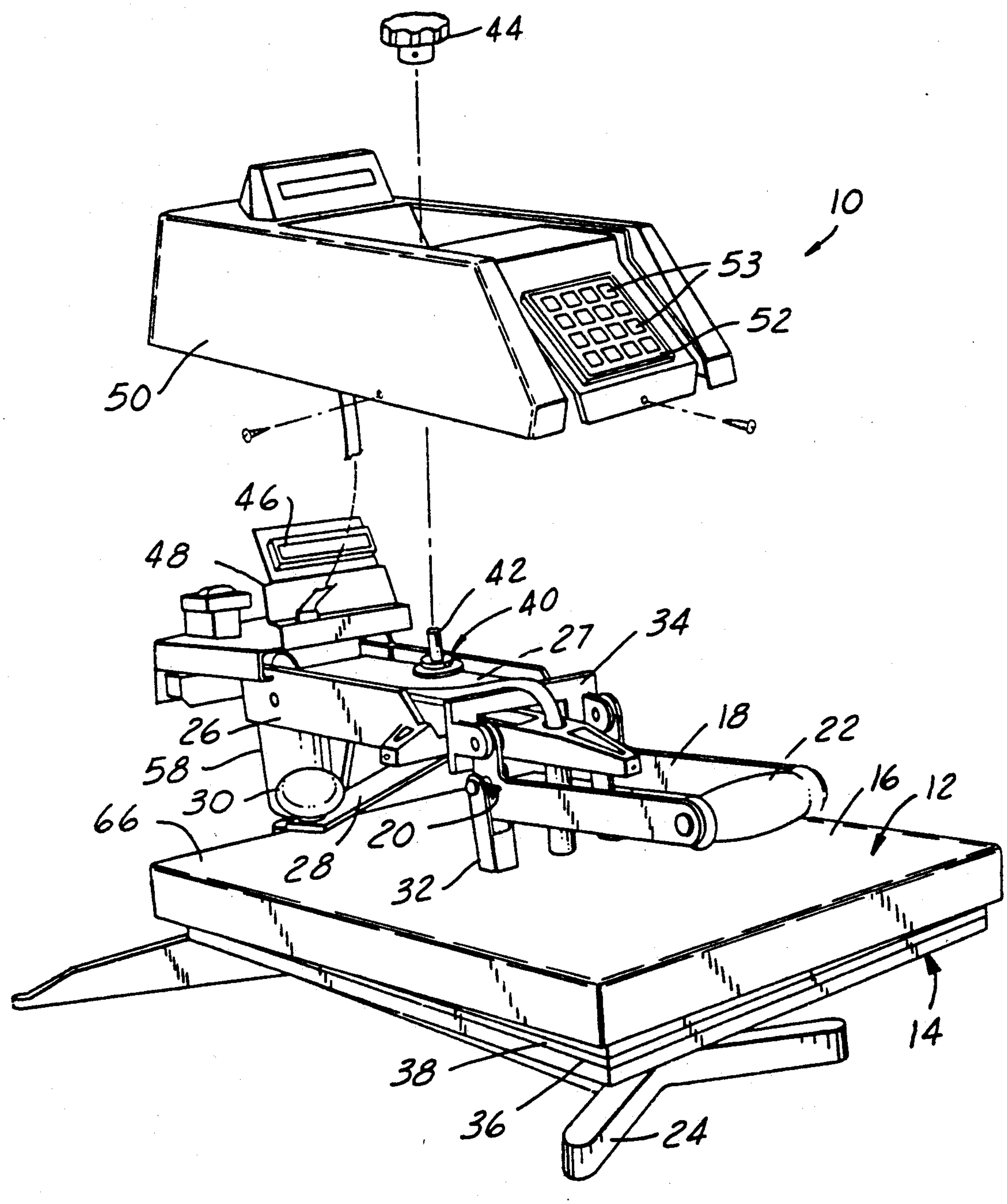
FIG. 1 is a perspective view of an improved heat sealing machine constructed in accordance with the present invention.

With reference to FIG. 1 of the drawings, an improved apparatus for thermally bonding indicia to fabric constructed in accordance with the present invention is generally indicated by 10 and is used for thermally bonding indicia such as letters, numerals and slogans to fabric such as T-shirts, sweatshirts, other garments, etc. As is more fully hereinafter described, the improved apparatus 10 is a manual heat sealing machine that is simple in construction and makes its use by an operator very simple.

As shown in FIG. 1 of the drawings, the improved apparatus 10 has relatively movable upper and lower platens 12,14 with a heat source 16 shown mounted in the upper platen for heating it. A lift lever 18 with an over-center locking assembly 20 and having a handle 22 is operated by a human operator to move the platens 12,14 between open and closed positions.

With continued reference to FIG. 1, the apparatus 10 includes a base 24 and a two-piece cantilever arm 26 including a pivotally mounted lever arm 27 mounted to the base for pivotal movement of cantilever arm 26 about an axis A in a horizontal plane extending above the base. A swing arm 28 extending from the cantilever arm 26 and having a knob handle 30 is graspable by the operator for rotational movement of the cantilever arm in the horizontal plane above the base 24. A clevis 32 connects the upper platen 12 to the lift lever 18. Lift lever 18 is connected to the free end 34 of the lever arm 27 of the cantilever arm 26. Lower platen 14 is removably mounted on base 24. Lower platen 14 includes an upwardly facing surface 36 on which a heat resistant Teflon pad 38 is mounted.

A pressure adjustment assembly 40 including an adjustment spindle 42 and adjustment knob 44 is used to vary the pressure between the platens when the platens are in a closed position. A visual display 46 provides a visual readout of pressure between the platens 12,14 on a scale of 1 to 9 and also displays operating instructions and commands in any of various languages and temperature and time readings. Visual display 46 is connected to a programmable controller 48 which is able to electronically store and recall numerous programmed instructions including a plurality of sets of temperature, pressure and platen closure period combinations.

A cover 50, shown in a removed position from apparatus 10, provides a shield against dirt and protects the controller 48 from unexpected intrusions. The cover 50 also provides a support for the keypad 52 which is used to interface the operator with the controller 48 and allow the controller to be programmed. The keypad 52 includes sixteen buttons 53 for the operator to access the controller 48.

Figure 2:
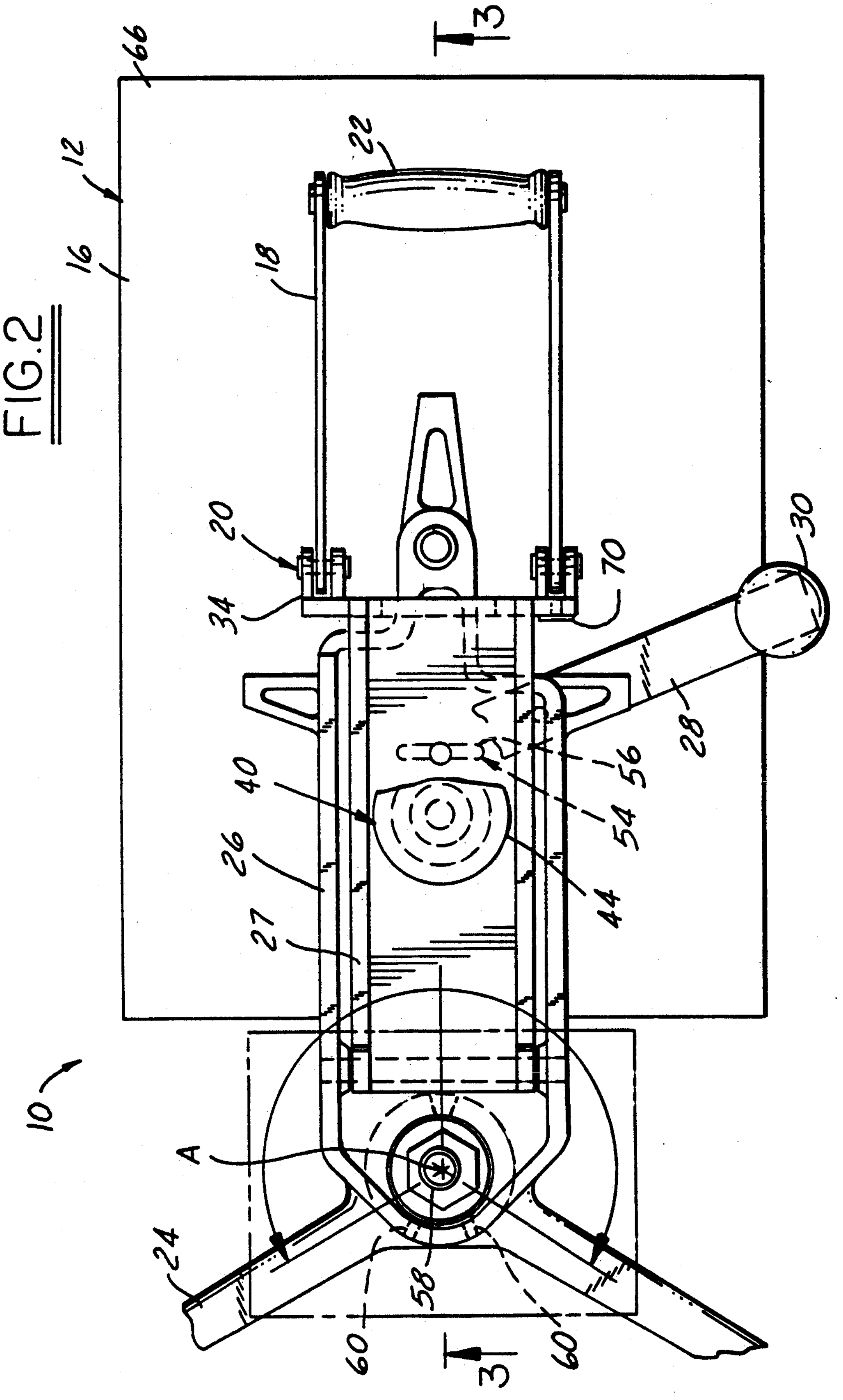
FIG. 2 is a plan view of the heat sealing machine showing a cantilever arm supporting an upper platen and illustrating a strain gage thereon the cantilever arm.

As shown in FIG. 2 of the drawings, the cantilever arm 26 includes a pressure sensor 54. The pressure sensor 54 is a strain gage 56 bonded to the cantilever arm 26 which in combination therewith creates a transducer for supplying an electrical signal proportional to the deflection of the cantilever arm to indicate the pressure between the upper and lower platens 12,14 in a closed position. A strain gage of the type known as Transducer Class strain gage by Measurements Group of Raleigh, North Carolina has proven very satisfactory although other strain gages work equally well.

With continued reference to FIG. 2, the cantilever arm 26 is shown for pivotal movement about axis A which defines the center of spindle 58. Spindle 58 is rigidly mounted to base 24. Spindle 58 includes threaded apertures 60 for receiving allen screws 63, seen in FIG. 3 that provide stops for the pivotal movement of cantilever arm 26. The stops are spaced to provide directional control of the pivotal movement of the cantilever arm 26 with respect to base 24 and also so that the platens 12,14 are stopped in alignment to close the platens.

Figure 3:
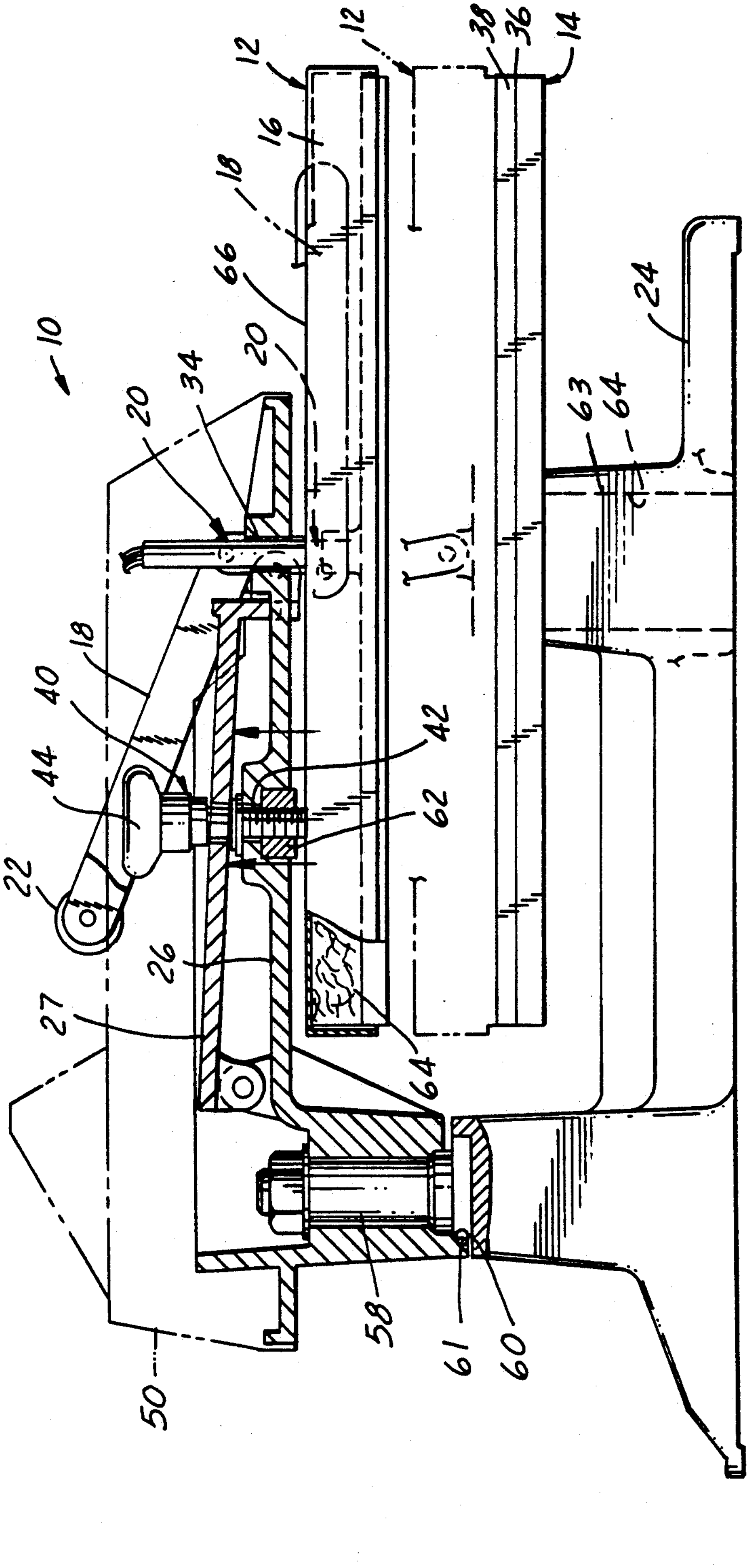
FIG. 3 is a sectional elevational view of the heat sealing machine taken along line 3—3 of FIG. 2.

FIG. 3 illustrates the upper and lower platens 12,14 in an aligned and open position. Operation of pressure adjustment 40 is readily seen. Cantilever arm 26 includes a threaded insert 62 which receives adjustment spindle 42 having corresponding threads. The adjustment knob 44, which acts as a fulcrum between the ends of lever arm 27, is rotated to change the elevation of the lever arm 27 to thereby change the pressure between upper and lower platens 12,14 when they are in the closed position, shown in FIGS. 1 and 4 or in the phantom in FIG. 3.

FIG. 3 also illustrates that the lower platen 14 is provided with a square post 63 received within a square aperture 64 in base 24 to permit 90° rotation of the lower platen with respect to the base for use with various garment applications.

Figure 4:
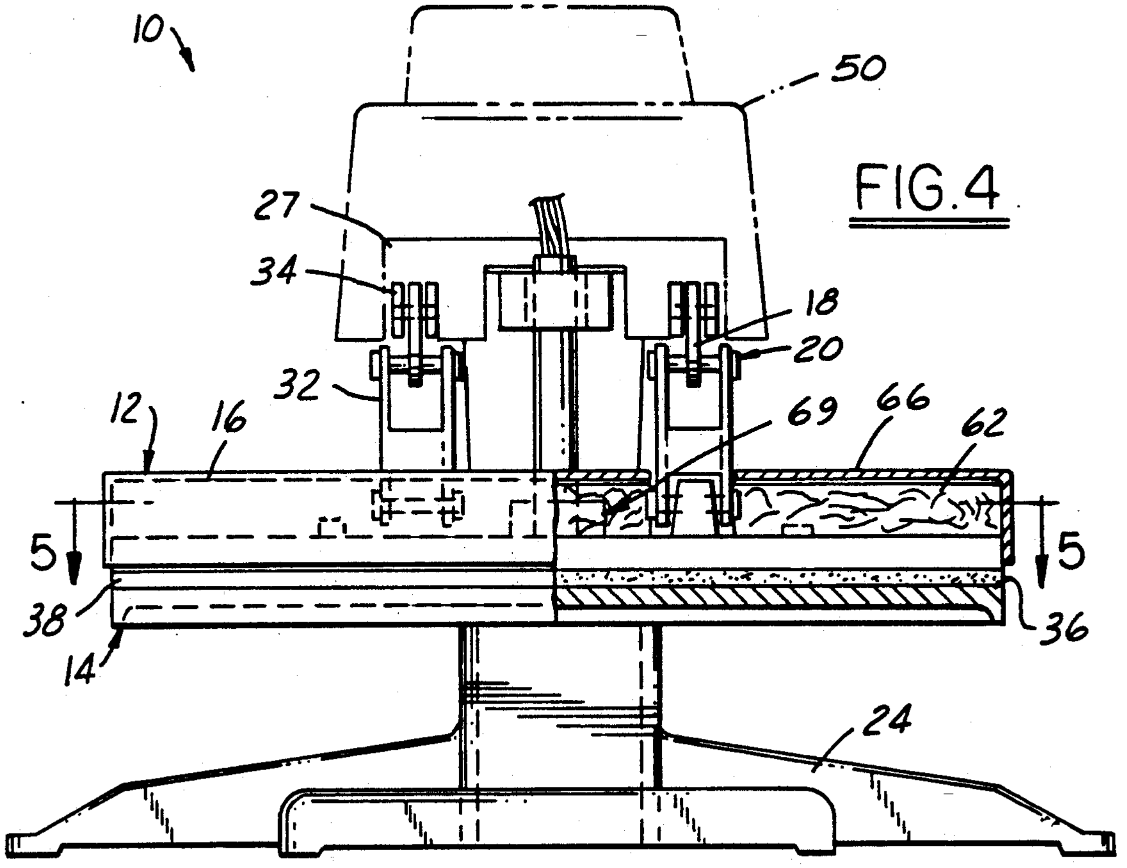
FIG. 4 is a front elevational view of the machine illustrating the construction of the upper platen shown for heating.

As shown in FIG. 4 of the drawings, upper platen 12 is heated and includes insulation 65 to keep the upwardly exposed surface 66 of upper platen 12 at ambient temperature.

Figure 5:
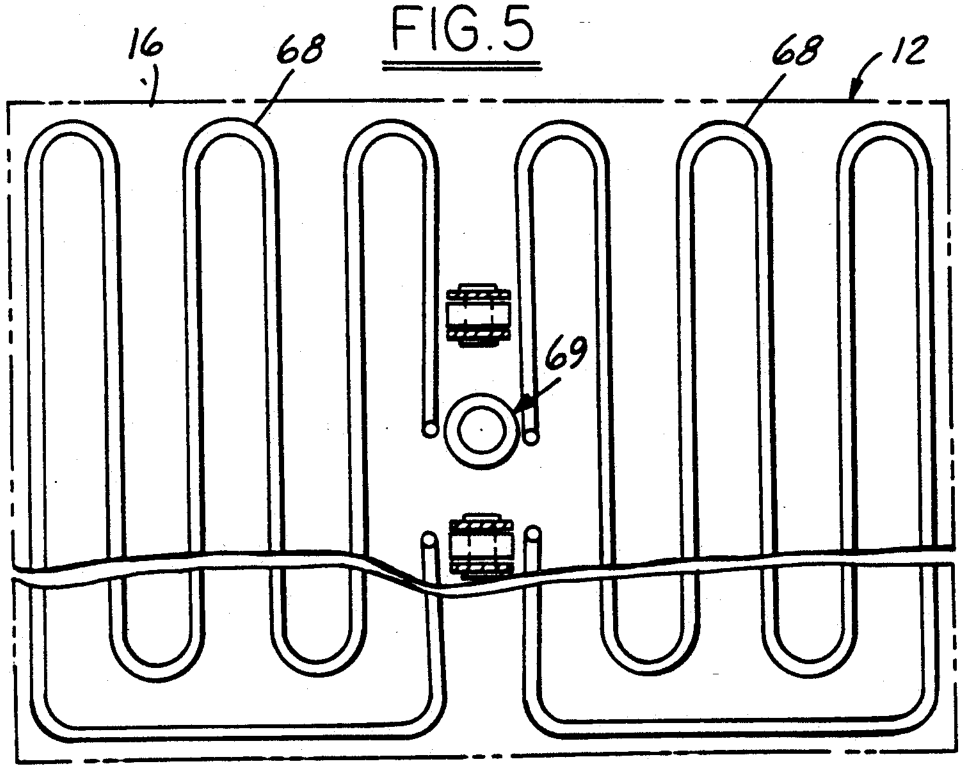
FIG. 5 is a sectional view taken along the line 5—5 in FIG. 4 illustrating the positioning of cal-rods in the heating platen.

FIG. 5 of the drawings illustrates the arrangement of cal-rod heating elements 68 in the upper platen 12. Preferably, the cal-rod heating elements 68 are spaced uniformly in the upper platen 12 to eliminate cold spots and create an even heating surface. Most preferably, the cal-rod heating elements 68 are spaced uniformly at 1½ inches apart. Preferably, a ¾ inch thick cast aluminum housing defines the upper platen 12. A thicker platen prevents warping and heat fluctuations in production runs.

A temperature sensor 69 is located in the upper platen 12 to sense the temperature of the heated platen and relay that information to the controller 48. Temperature sensor 69 is known as a resistance temperature detector or RTD and includes a printed circuit printed on platinum or iron alloy which when heated undergoes a material change and the electrical resistance of the temperature sensor changes. The temperature sensed is relayed back to controller 48 which acts as a thermostat and controls the temperature in the heated platen 12. The controller 48 is operable to control the temperature in the platen 12 and also to display that temperature on the visual display 46 in either degrees Fahrenheit or degrees Celsius.

Figure 6:
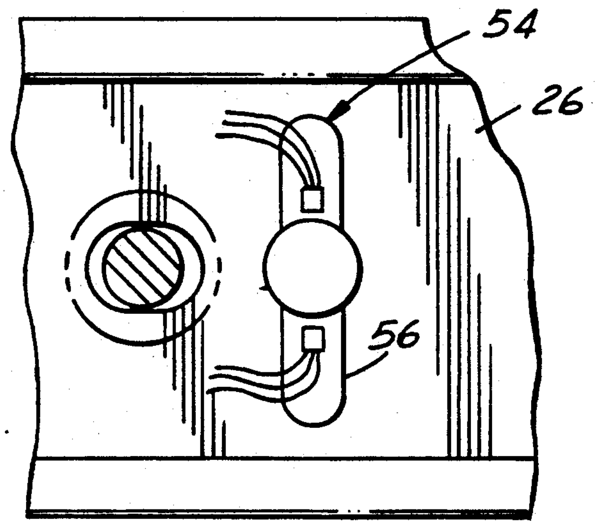
FIG. 6 is an enlarged sectional view of the strain gage on the cantilever arm.

FIG. 6 is a fragmentary view of the cantilever arm 26 and the strain gage 56. As earlier indicated, the strain gage 56 is bonded to cantilever arm 26 in such a way that in combination a transducer is created for providing an electrical signal which reflects flexure of the lever arm 27 and thereby indicates the pressure between the upper and lower platens 12,14 in the closed position.

The pressure sensed is transmitted to controller 48 for visual display on display 46.

Figure 7:
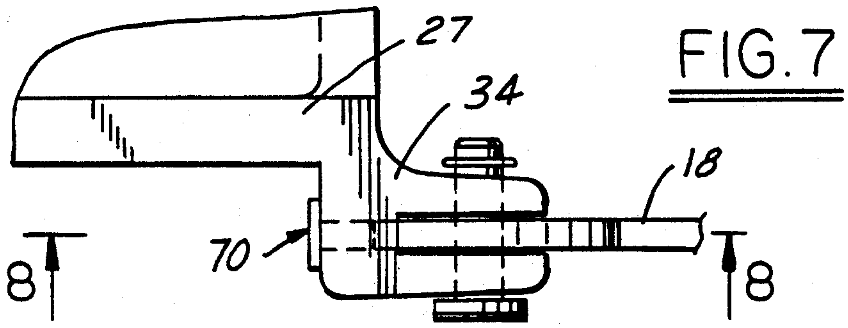
FIG. 7 is an enlarged sectional view illustrating an optical switch mounted under the cantilever arm for sensing closure of the upper platen against a lower platen.
Figure 8:
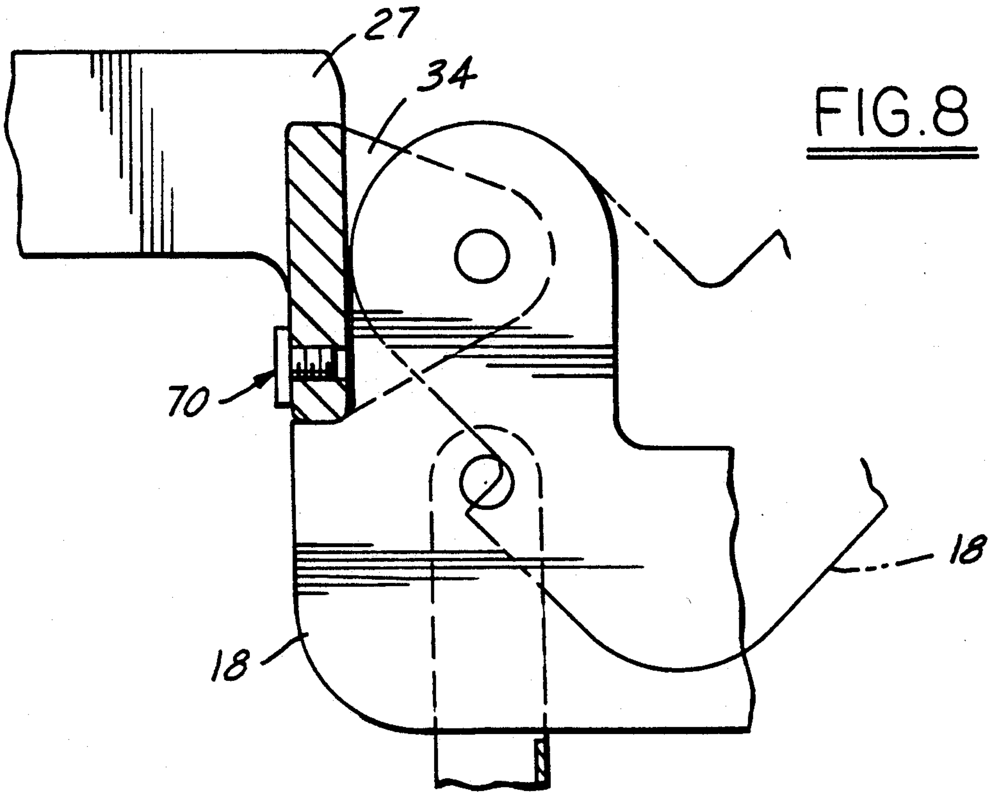
FIG. 8 is an enlarged sectional view taken along the line 8—8 in FIG. 7 illustrating the operation of the optical switch.

In FIGS. 7 and 8, an optical switch 70 is shown mounted to cantilever arm 26. Optical switch 70 is conventionally known as a reflective opto sensor and generates low intensity infrared light. The infrared light is reflected off the lift lever 18 when the lift lever is brought down to close the platens 12,14 as shown in FIG. 8 in solid outline. The same optical switch 70 receives back the reflected light and sends a signal to the controller 48 to indicate that the platens 12,14 are closed and to initiate a timing sequence. A switch such as a TRW reflective opto sensor is suitable for functioning as optical switch 70 although other switches are contemplated for use in the apparatus 10.

Figure 10:
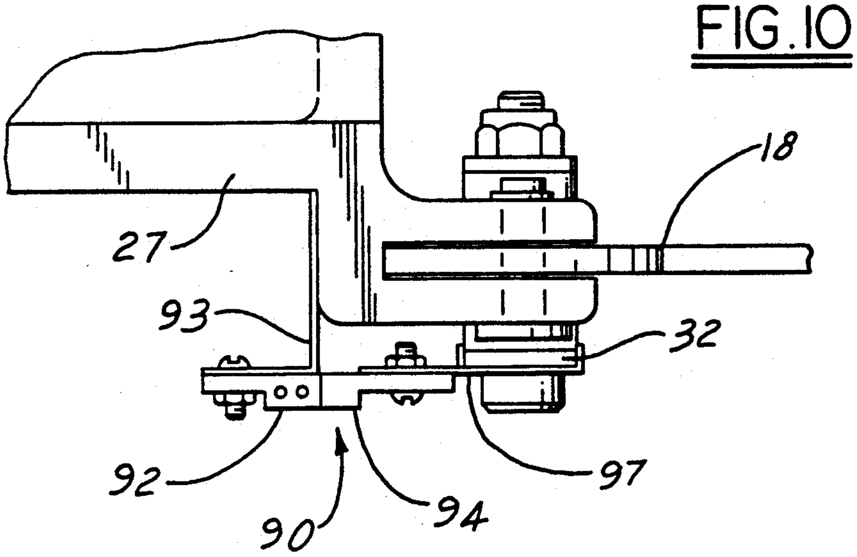
FIG. 10 is an enlarged sectional view similar to FIG. 7 but showing an alternative switch for sensing closure.
Figure 11:
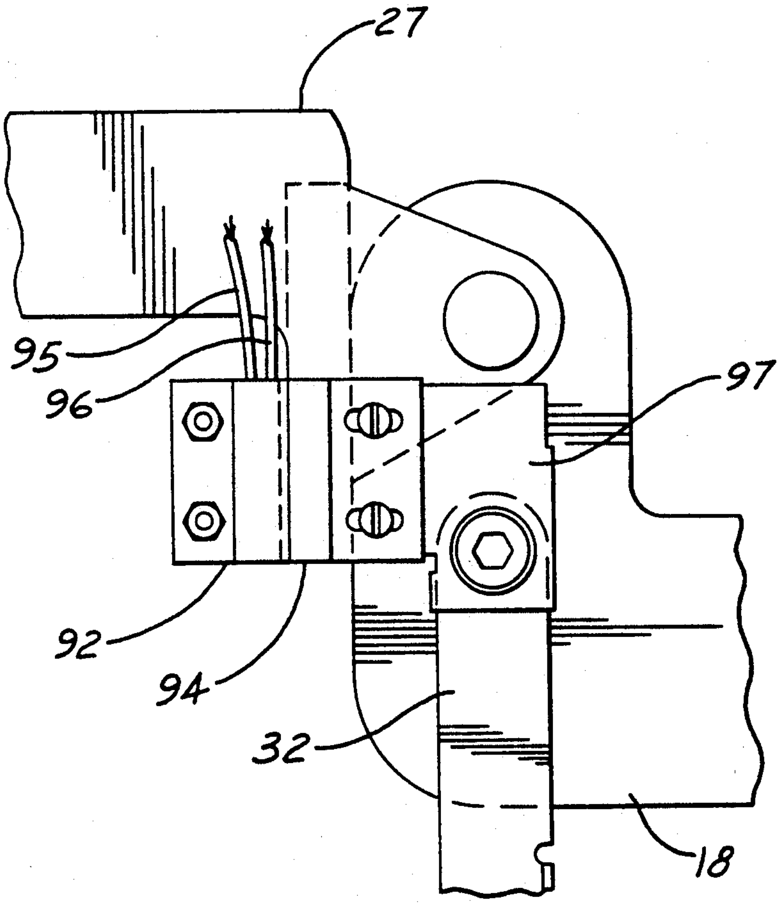
FIG. 11 is an enlarged sectional view similar to FIG. 8 but showing the alternative switch of FIG. 10.

As shown in FIGS. 10 and 11, a proximity switch 90 can be used instead of the optical switch 70 previously discussed. A first housing 92 encloses a switch while housing 94 encloses a magnet. The switch housing 92, such as a Hamlin 9027, is mounted at the end of lever arm 27 by a bracket 93 to register with magnet housing 94, such as a Hamlin 9035, mounted by bracket 97 to the clevis 32. In the position shown in FIGS. 10 and 11, the magnet in housing 94 closes the switch contacts in housing 92 in a well known manner and forming an electrical connection between conductors 95 and 96. When lever 18 is pivoted upward as shown in phantom line in FIG. 8, the magnet in housing 94 is displaced from housing 92, and opens the reed switch in the housing 92 in a well known manner. The housings 92 and 94 protect the reed switch and magnet from contamination which can affect operation of the control circuit including a timer. Thus, this embodiment of the sensor is less affected by dust or other debris that might obstruct the optical sensor.

Figure 9:
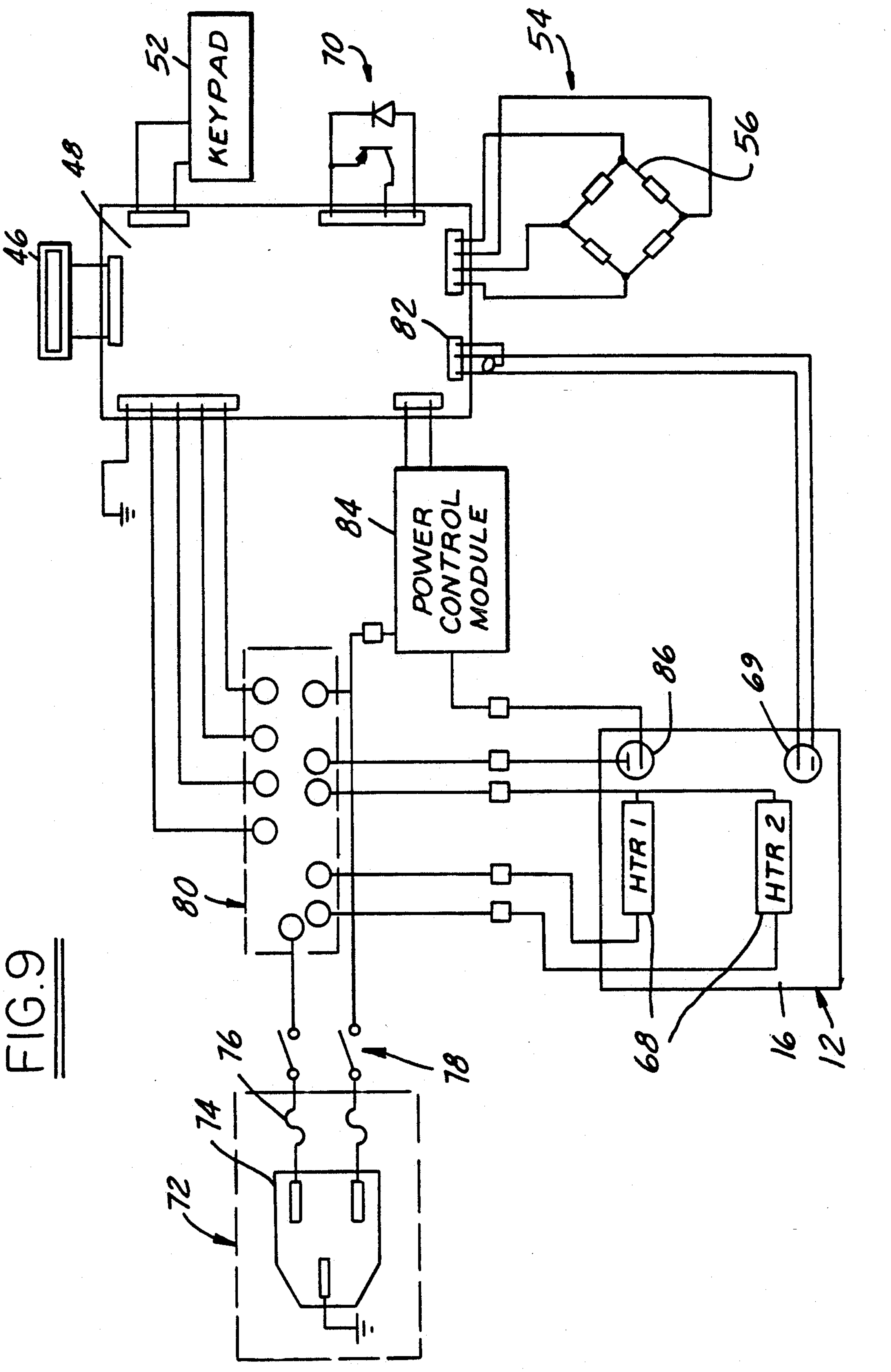
FIG. 9 is a schematic illustration showing the integrated control features of the machine.

FIG. 9 is a schematic of the electrical components of apparatus 10. Power is supplied to apparatus 10 by a power cord assembly 72 which includes a plug 74 suited for the appropriate electrical outlet of a given power source. The power cord assembly 72 also includes fuses 76 to prevent any overload to apparatus 10. A switch 78 is included to turn the power to apparatus 10 on and off. A terminal strip 80 which separates the incoming electrical power can be wired to receive and distribute either 110 volt current or 220 volt current for use with the apparatus 10. The incoming power is supplied via the foregoing to programmable controller 48 to thereby control and monitor the operation of the apparatus 10. Controller 48 is a microprocess base controller that operates on low voltage D.C. current and includes a program chip. Controller 48 monitors pressure sensor 54 and displays pressure between platens 12,14 in the closed position on the visual display 46.

Controller 48 receives a signal from the sensor such as reflective optical switch 70 or proximity switch 90 to initiate a timing sequence and actuate an alarm at the conclusion of the timing cycle. Controller 48 also monitors the temperature sensor 69 for controlling the temperature of the heated platen 12. A shield 82 is shown on the wiring to the temperature sensor 69 to keep interference from effecting the signal from the sensor. A power control module 84, conventionally known as a triac, switches the low voltage of the controller to the incoming voltage at the plug 74 to power the calrods 68 in plate 12. An overtemperature switch 86 opens the circuit to the heated platen 12 if and when the temperature of the platen becomes too hot.

The keypad 52 is connected to the controller 48 and allows the operator to input instructions with respect to platen temperature and time. Keypad 52 includes a chip with nine programmed memories for electronically storing and recalling nine sets of temperature, pressure and platen closure period combinations. Keypad 52 allows the operator to program the controller 48 for additional time, temperature and pressure settings as desired. Keypad 52 includes a calendar clock, not shown, to allow the operator to preprogram the controller 48 to automatically start the apparatus 10 and similarly automatically shut off the apparatus.

OPERATION OF THE APPARATUS

Apparatus 10 is started by plugging the machine into an electrical power supply and turning switch 78 on. Apparatus 10 then greets the operator by displaying "Hello" in the language of choice on the visual display 46. The visual display 46 then displays the time, date, and day, also in the language of choice. Apparatus 10 then asks the operator via the visual display 46 to "please wait" again the language of choice and displays the actual temperature and the preprogrammed temperature setting. The heating platen 12 is preprogrammed to heat to 330° F. or 165.5° C., the most common temperature setting used when applying letters, numbers, and logos to garments.

The operator uses the keypad 52 to select a desired time, temperature and pressure combination. This can be done by individually inserting the time and temperature or by selecting one of the preprogrammed settings and pushing a single button 53. When the apparatus 10 is ready to print, "ready to print" is displayed on the visual display 46. The garment on which the indicia is to be bonded is placed on the Teflon pad 38 which covers the upwardly facing surface 36 of the lower platen 14 to make the appropriate pressure adjustment and also to preheat the garment. The handle 22 on lift lever 18 is pulled down toward the operator to close the upper and lower platens 12,14. When the platens 12,14 are in the closed position, the visual indicator 46 displays the pressure between the platens on a scale of from one to nine. This scale is used to make operation of apparatus 10 as simple as possible.

After the pressure is adjusted, the handle 22 is grasped and lift lever 18 is lifted to separate the platens 12,14 so that the indicia can be placed on the preheated garment. With the indicia in place, the platens 12,14 are again closed and the timing sequence is initiated by the optical switch 70. When the duration of the preprogrammed timing sequence is complete, an alarm sounds and the visual indicator 46 displays the words "lift lever now" in the language of choice and the indicia is bonded to the garment.

While the best mode for carrying out the invention has been described in detail, those familiar with the art to which this invention relates will recognize various alternative designs and embodiments for practicing the invention as defined by the following claims.

What is claimed is:

1. A manually operated apparatus for thermally bonding indicia to fabric having relatively movable upper and lower platens with a heat source in one of the platens for heating it and mechanism for urging the platens together and for varying the pressure therebetween;

means for manually urging the platens into a closed position and automatically applying a predetermined, selectable pressure therebetween;

means for sensing pressure between the platens during closure;

means responsive to the temperature of the heated platen for controlling said heat source to regulate platen temperature;

means responsive to platen closure for timing the duration of closure; and means for providing a visual read-out of pressure between the platens, duration of platen closure and temperature of the heated platen.

2. The invention defined by claim 1 wherein said means for timing includes means for setting a predetermined closure time and further comprising audible alarm means for sounding an alarm in response to the expiration of the predetermined time set for platen closure.

3. The invention as defined by claim 1 further comprising means for electronically storing and recalling a plurality of sets of temperature, pressure and platen closure period combinations.

4. The invention defined by claim 3 further comprising said means for controlling said heat source and said means for timing the duration of platen closure being connected to said means for electronically storing and recalling said plurality of sets and being responsive to recalling any particular set to vary in accordance therewith the temperature of the heated platen, the duration of platen closure and the pressure to be provided between the platens.

5. The invention defined by claim 4 wherein said means for electronically storing and recalling temperature, pressure and platen closure periods is a programmable controller having memory capabilities.

6. The invention defined by claim 5 wherein said means for sensing pressure includes a pressure sensor including a strain gage detecting the pressure between the platens during closure, said strain gage being integrated with said programmable controller and said visual read-out to display the pressure detected.

7. The invention defined by claim 5 wherein said means for controlling said heat source includes a temperature sensor in said heated platen and a monitor connected to said temperature sensor, said monitor being operable as a thermostat and integrated with said programmable controller, and connected to said visual read-out to display the temperature sensed by said sensor.

8. The invention defined by claim 5 wherein said means for timing the duration of platen closure includes switched timer.

9. The invention defined by claim 8 wherein said switch timer includes an optic sensor for detecting platen closure and also a timer connected to said sensor to time the duration of platen closure said timer being connected to said visual read-out to display elapsed platen closure time.

10. The invention defined by claim 8 wherein said switched timer includes a magnetically actuated switch.

11. The invention defined by claim 1 wherein said means for providing a visual read-out includes switch means for altering the read-out from one temperature scale to another.

12. The invention defined by claim 1 wherein said means for providing a visual read-out includes switch means for altering the read-out from one language to another.

13. In apparatus for thermally bonding indicia to fabric having relatively movable upper and lower platens, the upper platen being carried by an arm, with a heat source in one of the platens for heating it and manually operable over-center mechanical locking mechanism for urging the platens together;

means for sensing the pressure urging the platens together; and means connected to the sensing means for providing a visual read-out of the pressure urging the platens together, the visual read-out being responsive to the mechanical flexure of the arm induced by the urging of the platens together.

14. The invention defined by claim 13 wherein said means for sensing pressure includes a pressure sensor defined by a transducer for converting the mechanical force of the platens in the urged together position to an electrical signal.

15. The invention defined by claim 14 further comprising means for sensing the temperature of the heated platens;

means connected to the temperature sensing means for controlling the temperature of the heated platen; and means for providing a visual read-out of the temperature of the heated platen.

16. The invention defined by claim 15 wherein said means for sensing temperature includes a temperature sensor in said heated platen and a thermostat connected thereto for controlling platen temperature.

17. In apparatus for thermally bonding indicia to fabric having upper and lower platens one of which is manually movable between open and closed positions relative to the other;

a cantilevered support arm for carrying one of the platens;

means mounted at the free end of the support arm for carrying the platen; and means responsive to flexure of the arm as the platens are closed to provide a read-out of pressure between the platens.

18. The invention defined by claim 17 wherein means responsive to flexure of the arm include a pressure sensor including a strain gage.

19. The invention defined by claim 18 wherein said strain gage is bonded to said arm to create a transducer.

20. The invention defined by claim 19 wherein said transducer creates an electrical signal proportional to flexure of said arm; said signal being displayed as a combination of digits on said read-out.

21. The invention defined by claim 17 wherein means are provided cooperating with the arm for adjustably positioning the arm toward or away from the other platen to vary the pressure between the platens.

22. In apparatus for thermally bonding indicia to fabric having upper and lower platens, the upper platen being manually pivotable to travel in both vertical and horizontal planes between open and closed positions relative to the lower platen;

a cantilevered support arm, including a lever arm, for carrying one of the platens;

means mounted at the free end of the lever arm for carrying the upper platen;

said means including a lift lever pivotally supported at one end on the lever arm;

platen actuating linkage connected to the other end of the lift lever for shifting the movable platen between the open and closed positions; and an adjustable fulcrum intermediate opposite ends of the lever arm and supporting the lever arm at adjustable positions relative to the support arm for varying the pressure between the platens when they are in the closed position.

23. The invention defined by claim 22 wherein said platen actuating linkage includes an over-center pivot for locking the movable platen in its closed position.

24. In apparatus for thermally bonding indicia to fabric having upper and lower platens, the upper platen being manually movable between open and closed positions relative to the lower platen;

a cantilevered support arm for carrying said upper platen and manually swingable laterally from a position to one side or the other of the opposite platen to a position in registry with it but spaced therefrom for the insertion of fabric and indicia therebetween; and stop means for selectively limiting swingable movement of the support arm in a first direction either to one side or the other side of the opposite platen, and arresting such movement in the opposite direction when the platens ar in registry.

25. In apparatus for thermally bonding indicia to fabric having upper and lower platens one of which is manually movable between open and closed positions relative to the other;

a cantilevered support arm for carrying one of the platens;

means mounted at the free end of the support arm for carrying said one platen; and means supporting the other platen; and means for displacing one of said upper and lower platens for repositioning in alternative, laterally rotated positions with respect to the other platen.

* * * * *